Jan. 9, 1951     C. H. HOEPPNER     2,537,056
PULSE MULTIPLEX SYSTEM
Filed Nov. 13, 1946     2 Sheets-Sheet 1
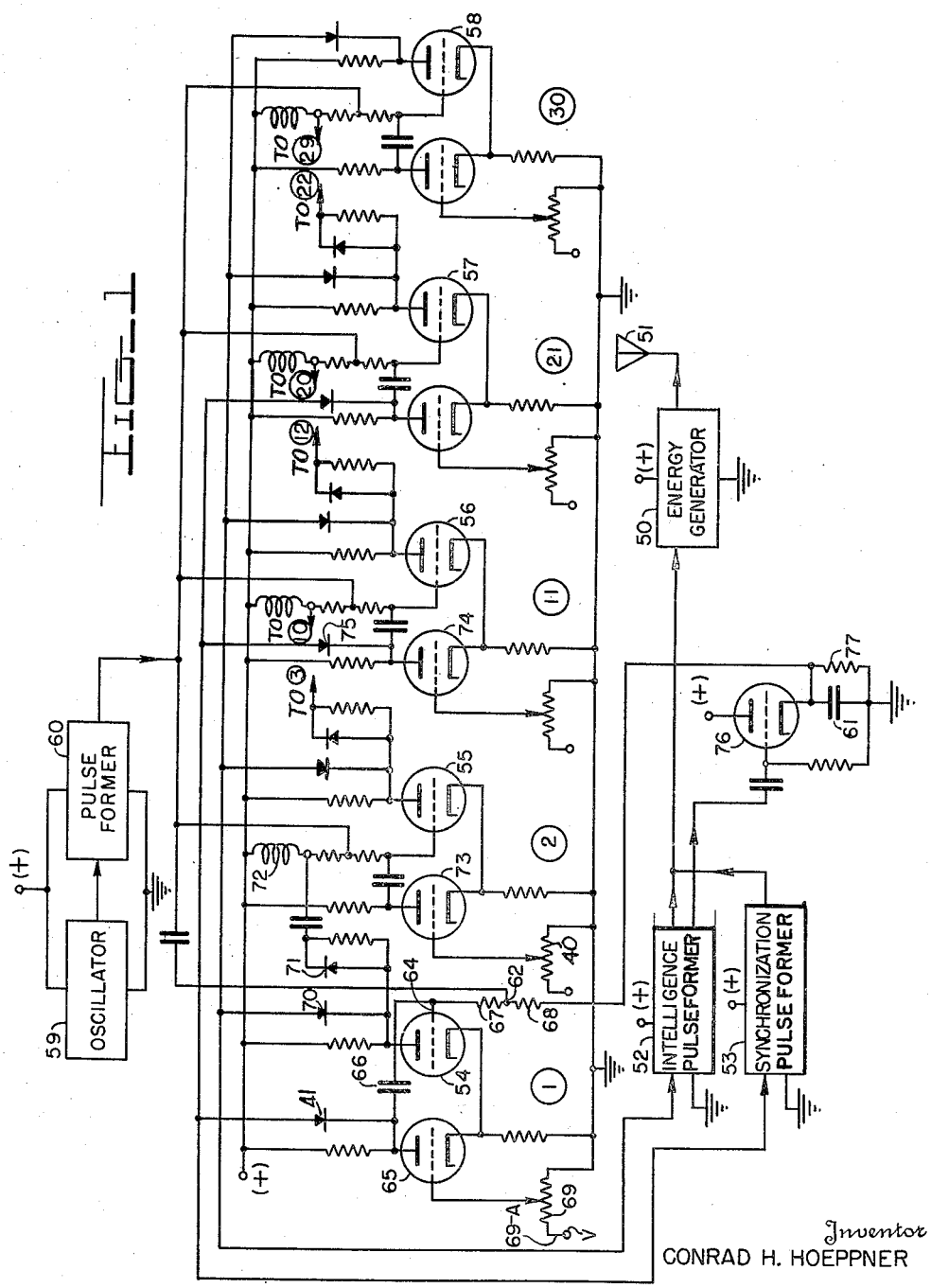
Inventor
CONRAD H. HOEPPNER
By *M. A. Hayes*
Attorney Jan. 9, 1951     C. H. HOEPPNER     2,537,056
PULSE MULTIPLEX SYSTEM
Filed Nov. 13, 1946     2 Sheets-Sheet 2
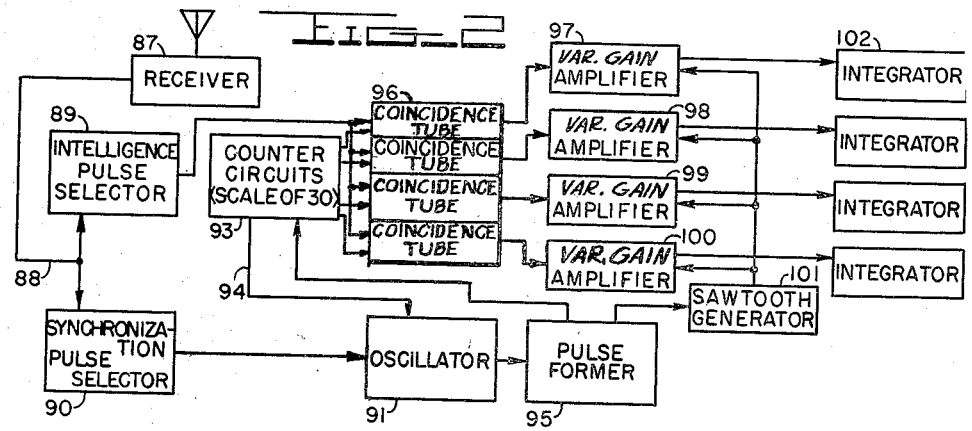
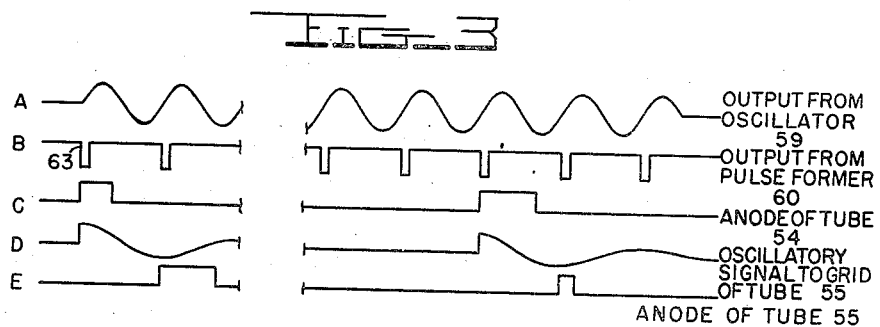
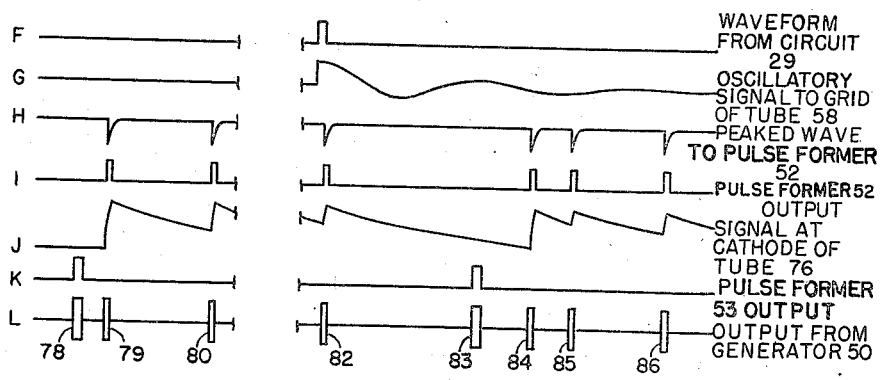
Inventor
CONRAD H. HOEPPNER
By M. O. Hayes
Attorney Patented Jan. 9, 1951

2,537,056

UNITED STATES PATENT OFFICE 2,537,056

PULSE MULTIPLEX SYSTEM

Conrad H. Hoeppner, Washington, D. C.

Application November 13, 1946, Serial No. 709,629

5 Claims. (Cl. 179—15)

(Granted under the act of March 3, 1883, as amended April 30, 1928; 370 O. G. 757)

This invention relates to multiplex communication systems and in particular to systems and apparatus for generating information relative to a plurality of variable quantities or signals.

In numerous applications of communication equipment it is desirable to convey intelligence relative to a plurality of variable quantities via a single communication link whether it be typically a wire or a radio device. In the practical case such intelligence communication may be considered satisfactory with intermittent intelligence transmission or time sharing for each quantity provided the amount of variation in each quantity is small in the interval of time between successive periods of intelligence transmission for the quantity or where large variations are experienced which may readily be transformed as by a counter into a type having small variations in the time interval between successive periods. Pulse train type signal transmission is commonly employed for such time sharing operations. Selected pulse signals of the train are allotted to each of the quantities and information relative to the quantities is then transmitted by time variations in the intelligence conveying pulse signals from selected, previously established, reference characteristics. To establish these reference characteristics it is necessary to transmit, within the train of pulse signals, synchronizing pulses of a character distinct from the intelligence conveying pulses. The actual intelligence transmitting time is quite limited because of the duration of the synchronizing pulses as well as the "guard" time which must be allowed on each side of the synchronizing pulses to prevent interference with intelligence conveying pulses.

For the transmission of intelligence relative to certain types of variable quantities it is desirable that the "sampling period," which is defined as the interval of time allotted to the transmission for each variable quantity, occur at a constant selected recurrence frequency. Such a condition is desirable, for example, in the transmission of intelligence relative to random phenomena. Such random phenomena for example may be converted into a signal possessing a relatively low rate of variation by a counter device operative to count the number of random signals occurring between successive periods of transmission.

It is therefore an object of the present invention to provide a method of multiplex communication employing a small number of synchronizing signals and in which the sampling time for each quantity is held constant.

Another object of the present invention is to provide apparatus for multiplex communication relative to a plurality of quantities in which a small number of synchronizing signals are required and a constant sampling time is allotted for each quantity.

Another object of the present invention is to provide multiplex communication receiver apparatus responsive to pulse type of intelligence conveying signal groups containing a small number of synchronizing signals.

Another object of the present invention is to provide in a pulse communication system a modulator device producing, for transmission via a single transmission link, intelligence conveying pulse type signals together with a relatively small number of synchronizing pulse signals.

Other and further objects and features of the present invention will become apparent upon a careful consideration of the accompanying drawings and detailed description of an exemplary embodiment.

Figure 1 is a schematic diagram partly in block of the transmitting end components of a typical pulse type communication system constructed according to the teachings of the present invention.

Figure 2 is a block diagram of receiver components designed to extract the intelligence placed upon the signal emitted by the transmitter device of Figure 1.

Figure 3 shows a series of waveforms which are taken to illustrate more fully the operation of the transmitter circuit of Figure 1.

In accordance with the general principles of the present invention a pulse type communication system is provided for the transmission and reception of information relative to a plurality of variable quantities. Such variable quantities may be of diverse natures such as individual low frequency signals or may be derived from meter readings such as those of pressure, temperature, or humidity. In certain quantities, particularly those relative to rapidly varying phenomena such as static bursts it is not practical to transmit intelligence relative to each particular burst, however, in many cases it is sufficient to average the number of bursts occurring over known intervals of time. In such measurements counters may be conveniently employed deriving a voltage signal in dependency on the rate of variation of the bursts from one time interval to another. It is readily seen therefore that for such observations, it is necessary that the time intervals over which the bursts are counted be of uniform duration. The two desirable features, of uniform sampling time and small number of synchronizing pulses are realised by equipment constructed according to the teachings of this invention.

In accordance with the fundamental concepts of the present invention, a communication system employing particular signal reception and transmission means is provided for multiplex operation. Located within both the transmission and reception means are highly stable time determining elements adapted to be set into operation by a first signal. The transmitter time determining element is set into operation by a first signal of a recurrent series of signals. Subsequent signals of the recurrent series are then produced at selected intervals of time after the first signal in dependency on the intelligence quantities to be transmitted. A selected interval of time following the first signal is allotted to each of the subsequent signals and the position of the appropriate signal within this time interval is made the basis of intelligence transmission.

Determination of the position of the subsequent signals within their respective allotted time intervals is accomplished in the signal reception means with the aid of a highly stable time measuring device which is set into operation by the received first signal. Signal counting and separation circuits in the signal reception means then detect time variations of the subsequent signals within their allotted time intervals and produce separate output signals in dependency on the time variations of these subsequent signals.

Where information relative to a large number of quantities must be transmitted, it is not generally possible to maintain proper synchronization of the receiver time measuring device over a long period of time. Instead it is very satisfactory to send several, perhaps three or more synchronizing signals, interspersed at equal intervals between the subsequent or "intelligence" signals.

With particular reference now to Figure 1, a transmitter system adapted particularly to radio frequency communication is shown. The radio frequency energy is produced by a modulated high power generator 50 which drives a suitable antenna or radiating device 51. Modulation of the energy generator 50 is produced by either of two pulse forming networks 52, 53 which produce respectively intelligence modulation signals or synchronization modulation signals. A greater degree of flexibility is provided by the two pulse forming networks 52 and 53 since it is desired that the synchronizing pulse signals possess characteristics differing from those of the intelligence conveying pulse signals. Typically the intelligence pulse former may be any of a number of well-known pulse forming networks designed to produce signals having a selected duration, the synchronization pulse former may be a similar network designed to produce pulses of greater duration. The intelligence pulse former 52 produces narrow pulses (79 in Fig. 3) whose relation in time to the wider pulses (78 in Fig. 3) of the synchronization pulse former 53 is a function of the intelligence to be transmitted. The respective pulse outputs of pulse formers 52 and 53 operate as enabling pulses to modulate the energy generator 50, thus energy is radiated from antenna 51 for the duration of each of the intelligence modulation pulses from modulator 52 and each of the synchronization modulation pulses from pulse former 53. To impart a time modulation to the intelligence signals with respect to the synchronization signals for subsequent utilization by a receiving system the additional components of Figure 1 are required. These additional components include a plurality of trigger circuits such as those identified by the encircled numerals 1, 2, 11, 21 and 30, each of which preferably is held in one stable conductivity state in which the tubes 54, 55, 56, 57 and 58 are conductive. All of the trigger circuits are arranged in a tandem manner, that is, circuit 2 is connected to circuit 1 and so forth, only selected circuits of a 30 circuit tandem being shown in Figure 1.

To regulate the operation of the trigger circuits to produce a constant sampling period a highly stable oscillator 59 is provided. The period of the output frequency of said oscillator is a measure of the sampling period. Said output is a sinusoidal-type signal of very accurately known and controlled frequency as shown by waveform A of Figure 3. This sinusoidal signal is clipped and otherwise shaped in a pulse former 60 to produce a series of relatively short duration pulses such as those shown in waveform B of Figure 3. The negative polarity pulses as taken from the pulse former 60 are applied through coupling circuits to the normally conductive tubes 54, 55, 56, 57, 58 of the trigger circuits. To initiate tandem operation of the trigger circuits, an initial condition of low positive voltage across capacitance 61 is chosen. In this condition the potential at the resistance junction point 62 is low but not sufficiently low to stop conduction by tube 54. Upon receipt of the first negative pulse of waveform B this additional negative grid drive voltage is sufficient to drive grid 64 below cut off voltage to stop conduction by tube 54 and render tube 65 conductive. Tube 65 subsequently remains conductive until grid 64 rises upon discharge of capacitance 66 to a potential permitting a return to conduction by tube 54. The time interval required for this discharge of capacitance 66 is dependent upon many factors. In addition to the time constant of the capacitance discharge path which includes resistances 67 and 68 this time is also affected by the amplitude of the initial drop in voltage at the anode of tube 65. Thus, if tube 65 is capable of heavy conduction, grid 64 is initially driven further negative than when tube 65 is capable of low conduction. It is thus possible to vary the duration of the unstable period in trigger circuit 1 by variations in the biasing voltage upon the grid of tube 65 supplied through the potentiometer 69. Therefore, the duration of the cut off period for tube 54 may be varied in accordance with an amplitude modulated signal applied to terminal 69—A of potentiometer 69. Said cut off period for tube 54 is represented by the positive pulses of waveform C in Fig. 3.

At the instant tube 54 is cut off by the first negative pulse of waveform B, tube 65 is rendered conducting and a negative pulse begins at its plate. Said negative pulse at the plate of tube 65 is supplied through unilateral impedance element 41 to trigger with its leading edge the synchronization pulse former 53. In response thereto energy generator 50 produces the first synchronizing pulse shown as 78 in waveform L of Fig. 3.

At the conclusion of the unstable state of trigger circuit 1, the drop in voltage at the anode of tube 54 is supplied through a unilateral impedance element 70 to the intelligence modulator 52, the voltage pulse formed at the anode of tube 54 is shown in waveform C of Fig. 4. The negative excursion or trailing edge of this pulse along with the trailing edges of the pulses successively produced at the anodes of tubes 55, 56, 57—58, trigger the pulse forming network in pulse former 52 to produce the narrow intelligence pulses. The drop in voltage at the anode of tube 54 applied to modulator 52 is operative to cause a first pulse signal to be produced thereby for operation of energy generator 50. Said energy generator is therefore triggered in response to the time duration of the unstable period of trigger circuit 1. This is pulse 79 in waveform L.

It will be understood that the synchronizing pulses exemplified by pulse 78 from the synchronization pulse former 53 are similarly produced in response to the leading edge of the negative excursions successively produced at the anode of tube 65 and the normally nonconducting tubes in trigger circuits 11 and 21. Therefore it appears that the time separation between pulses 78 and 79 of waveform L is determined by the duration of the unstable state of trigger circuit 1 and this in turn is controlled by the amplitude of the intelligence signal applied across the grid resistor 69 of tube 65. Similarly, the pulse outputs of the other channels are modulated in time with respect to their reference pulses from pulse former 60 by varying the time duration of the unstable states of trigger circuits 1, 2, 3, 4 . . . 30. This is illustrative of the manner in which time modulation is introduced to the transmitted pulse train.

The tandem connection of the trigger circuits permits the unstable condition to exist in only one of the circuits at any instant of time. Circuit 1 thus set into operation by the combination of the low voltage across capacitance 61 and the first negative pulse 63 must set trigger circuit 2 into operation at the proper time. Such action of circuit 2 is facilitated by a unilateral impedance element 71 and the inductance 72. Simultaneously with the initiation of conduction within tube 65 a positive voltage signal is applied through element 71 to inductance 72 to produce an oscillatory voltage thereacross. At a subsequent interval in time this voltage reaches a negative value of sufficient amplitude which, when combined with a second negative pulse from pulse former 60, will produce cutoff of tube 55. Such action is illustrated in waveforms D and E of Figure 3 which show, respectively, the normal voltage produced across inductance 72 and the positive pulse produced at the anode of tube 55 during the interval of time when tube 73 is conductive. Again the period of conduction within tube 73 may be varied in accordance with an amplitude modulated signal applied across potentiometer 40. Likewise trigger circuit 2 is caused to initiate operation of a trigger circuit 3 of the tandem (not shown) for continued operation.

As operation is thus continued down the line of trigger circuits, trigger circuit 11 is brought to its time of operation. When the tube 74 becomes conductive as a result of the cut-off of tube 56 the negative pulse produced at the anode thereof is supplied through the unilateral impedance element 75 to produce operation of the synchronization modulator 53 to emit a second synchronizing signal in the pulse train.

At the conclusion of the negative pulse of trigger circuit 30 it may be seen that the enabling signal produced at the anode of tube 58 will not be supplied to a subsequent trigger circuit and pulse generation will cease. This action is necessary where a plurality of synchronizing pulses are employed to provide some means for identifying the synchronization pulse accompanying the start of conduction by tube 65. Responsive to the intelligence modulation signals generated by modulator 52 is a cathode follower type integrating device employing electron tube 76 and the previously mentioned capacitance 61. Electron tube 76, whose grid is driven by the output of modulator 52, is brought to heavy conduction by each of the pulses from said intelligence modulator 52 to produce a positive charging of capacitance 61 raising the average potential at the grid 64 to prevent triggering of circuit 1 by each negative pulse of waveform B. With the cessation of pulses after the trigger pulse from trigger circuit 30 (see pulse 82 of waveform L) the inactive condition of modulator 52 prevents further charging of capacitance 61 through electron tube 76 however the discharge of capacitance 61 through the shunting resistance 77 is permitted. After a selected interval of time this discharge again places the potential at junction 62 at a low positive voltage so that tube 54 may be cutoff by a subsequent negative pulse of waveform B from pulse former 60 to again initiate tandem operation of the circuit. Since it is desired that a minimum of the transmitting time be lost in this manner it is convenient that the discharge path for capacitance 61 be adjusted to permit a second operation of trigger circuit 1 by the second pulse following that causing operation of trigger circuit 30. Typical of the voltage variations produced across capacitance 61 are those shown in waveform J.

The composite output signals from the energy generator 50 produced by the operation of the intelligence modulator 52 and the synchronization modulator 53 are shown by waveform L. They include first a wide pulse 78 produced by the synchronization modulator 53 in response to the initiation of conduction within tube 65. A second pulse 79 whose relation in time with respect to pulse 78 is a function of the intelligence signal placed thereon, is produced as a result of the operation of intelligence modulator 52 upon the return to conduction of tube 54. Again a narrow intelligence pulse 80 is produced upon the return to conduction of tube 55 of trigger circuit 2. After a time interval during which intermediate trigger circuits operate, a narrow intelligence pulse 82 is produced by modulator 52 in response to the return to conductive condition of tube 58. Thereafter an interval of time elapses before the initial synchronizing pulse 83 of a second wavetrain is produced upon second operation of trigger circuit 1. Again pulse 84 is produced upon return to conduction of tube 54 and pulse 85 upon return to conduction of tube 55.

The receiver indicated in block in Figure 2 is of a design to permit operation with a pulse type waveform such as that of L in Figure 3 to extract the intelligence contained in time position variation of the intelligence pulses. To this end conventional amplification and detection means may be incorporated in the block indicated in general by numeral 87. The pulse type output into line 88 is supplied in parallel to an intelligence pulse selector 89 and a synchronization pulse selector 90. The intelligence pulse selector 89 may be any known pulse selective network which will respond to the narrower pulses such as 79 and 80 of waveform L but reject the wider synchronizing pulses such as 78 and 83. Conversely, the synchronization pulse selector 90 may be any known pulse selective network which separates and rejects said narrow pulses from said wider pulses. The wider synchronization pulses so selected trigger an oscillator 91 which produces a reference signal having the same frequency as that of the transmitter oscillator 59. The oscillator 91 output may be applied to a pulse former 95 to produce pulses similar to waveform B of Fig. 3. The pulse former output is applied to a counter circuit 93 shown as a scale of 30 counter to correspond to the 30 channel transmitter system shown in Fig. 1. After counting 30 pulses the counter circuit sends a disabling signal through line 94 to oscillator 91 cutting off said oscillator until the next synchronizing pulse is received.

The narrow pulses passed by the intelligence selector 89 are applied in parallel to a plurality of coincidence circuits 96. For convenience only four of such circuits are shown, in practice one such circuit is required for each channel of the system. The coincidence circuits 96 may be conventional circuits using multi-grid tubes and should be so biased that an output is produced only by coincidence of signals from the intelligence pulse selector 89 and the counter circuit 93.

The counter circuit's response to the first pulse from pulse former 95 is applied to the first coincidence circuit, the response to the second pulse is applied to the second coincidence circuit, and so on, thus rendering the coincidence circuits consecutively responsive to received intelligence signals. Since the intelligence signals have a constant sampling period based on a frequency equivalent to that of oscillator 91 which feeds the counter circuit 93, the consecutive intelligence pulses are thereby separated and applied to corresponding variable gain amplifiers exemplified at 97 through 100.

The output of the pulse former 95 responsive to oscillator 91 is also applied as a synchronizing signal to a sawtooth generator 101, thus producing a sawtooth waveform for each output of the counter circuit. The output of said sawtooth generator is applied in parallel to the aforesaid variable gain amplifier 97 through 100 to change the time modulation of the intelligence pulses to amplitude modulation. The sawtooth generator 101 is preferably of the triggered variety, producing a series of recurrent waveforms when triggered or initiated by a pulse signal from pulse former 95. The sawtooth waveforms thus produced are applied to the variable gain amplifiers to produce a variation in the amplification produced thereby. In this manner the intelligence signals delivered to the variable gain amplifiers immediately following the initiation of the sawtooth voltage will produce an output signal having an amplitude different from those delivered during a later portion of the sawtooth signal.

The variable amplitude signals in the output from the variable gain amplifiers are integrated by a peak riding integrator device 102. In practice a separate integrator is supplied for each variable gain amplifier as shown. The integrator is preferably of a type which will follow variations in the amplitudes of successive signals and which will maintain a level as established by a prior signal in the interval of time between a prior signal and a succeedent signal.

From the foregoing discussion it is apparent that considerable modification of the features of the present invention is possible and while the devices here shown and the forms of apparatus for the operation thereof constitute a preferred embodiment of the invention it is to be understood that considerable modification of these devices and forms of apparatus may be made without exceeding the scope of the invention which is defined in the appended claims.

The invention described herein may be manufactured and used by or for the Government of the United States of America for governmental purposes without the payment of any royalties thereon or therefor.

What is claimed is:

1. A method for multiplex pulse communication providing a plurality of intelligence conveying channels, comprising; generating a first series of pulse signals, producing from the first series of pulse signals a second series of pulse signals having individual pulses delayed from corresponding pulses of the first series by amounts of time variable in dependency on the intelligence to be communicated thereby, generating a third series of pulse signals having characteristics distinct from those of the second series and bearing selected time relationships to selected pulses of the first series, transmitting the second and third series of pulse signals, receiving the transmitted pulse signals, generating a train of timing pulses at the receiving locality, synchronizing the timing pulses with the first series of pulse signals by the received third series of pulse signals, and measuring the time interval between received pulses of the second series and corresponding pulses of the synchronized train of timing pulses.

2. Apparatus for multiplex communication with a plurality of intelligence conveying channels, comprising; first generator means producing a first series of pulse signals, second pulse generator means deriving from the first series of signals a plurality of intelligence conveying signals individually time spaced from a corresponding pulse signal of the first series by an amount of time in dependency upon the intelligence to be conveyed by each, third pulse generator means producing from the first series of pulse signals a third series of signals of lower average recurrence frequency than the first and second series and bearing distinctive characteristics from the second series, means transmitting the second and third series of signals, means receiving the transmitted signal at a distant locality, high stability oscillator means associated with said reception means producing a series of timing signals having a frequency substantially equal to that of the first series, means establishing in response to the received third series of signals a selected time relationship between the operation of said oscillator and the first generator means, and means measuring, individually the time spacing between each received intelligence conveying signal and the preceding timing signal.

3. In a communication system, a pulse intelligence modulator, comprising; a signal generator for producing a timing signal of stable recurrence frequency, a plurality of two-conductivity-state trigger circuits each possessing one stable conductivity state, said trigger circuits connected in tandem and synchronized in operation by the signal generator, means initiating the unstable conductivity state in the first trigger circuit of the tandem in response to a first signal from the signal generator, means adjusting the duration of the unstable conductivity state in the first trigger circuit in accordance with a first intelligence quantity to be transmitted, means enabling subsequent trigger circuits selected intervals of time after the initiation of the unstable state in the previous circuit permitting initiation of the unstable state in the subsequent trigger circuits in response to subsequent signals from the signal generator, means controlling the duration of the unstable state in each of the subsequent trigger circuits in accordance with additional intelligence quantities to be transmitted, means permitting a recurrence of the unstable state in the first trigger circuit after a selected interval of time following the conclusion of the unstable state in the last trigger circuit of the tandem, first pulse generator means producing intelligence transmission signals of selected characteristics in response to the conclusion of the unstable state in each of the trigger circuits, and second pulse generator means producing synchronization transmission signals in response to the initiation of the unstable state in selected trigger circuits.

4. A signal reception intelligence reproducing system responsive to intelligence transmission and synchronization transmission signals of the character produced by the apparatus of claim 3, comprising; a signal generator for producing receiver timing signals of stable recurrence frequency, control means placing said signal generator in synchronized operation in response to the synchronization transmission signals, time measuring means for determining the time displacement between each received intelligence transmission signal and the receiver timing signal preceding it, and receiver output means producing separate intelligence output signals in dependency on variations in the time displacements of corresponding intelligence signals occurring over a period of time.

5. Signal reception intelligence reproducing apparatus responsive to intelligence transmission and synchronization transmission signals of the character produced by the apparatus of claim 3, comprising; a signal generator for producing a receiver timing signal of stable recurrence frequency, synchronization control means placing said signal generator in synchronized operation in response to the synchronization transmission signals, counter means having a plurality of output channels operative to deliver an enabling signal to each channel in sequence in dependency on the receiver timing signals, a plurality of biased amplifier means for receiving intelligence transmission signals in parallel and the enabling signals individually, responsive to deliver individual intelligence transmission signals, a sawtooth voltage generator circuit for producing a voltage varying substantially linearly with time following each receiver timing signal, second biased amplifier means for receiving the sawtooth voltage signals in parallel and the individual intelligence transmission signals individually, to produce individual signals in amplitude dependency on the time displacement of the individual intelligence transmission signals from the preceding receiver timing signals, and individual peak-riding amplitude integrater means responsive to the individual amplitude variable signals to produce filtered intelligence output signals possessing substantial freedom from amplitude variations in the time interval between individual signals.

CONRAD H. HOEPPNER.

REFERENCES CITED

The following references are of record in the file of this patent:

UNITED STATES PATENTS

| Number | Name | Date |
| --- | --- | --- |
| 2,262,838 | Deloraine | Nov. 18, 1941 |
| 2,272,070 | Reeves | Feb. 3, 1942 |
| 2,402,916 | Schroeder | June 25, 1946 |
| 2,402,917 | Miller | June 25, 1946 |
| 2,406,165 | Schroeder | Aug. 20, 1946 |
| 2,408,077 | Labin | Sept. 24, 1946 |
| 2,409,229 | Smith | Oct. 15, 1946 |
| 2,413,023 | Young | Dec. 24, 1946 |
| 2,414,265 | Lawson | Jan. 14, 1947 |
| 2,416,330 | Labin et al. | Feb. 25, 1947 |
| 2,418,116 | Grieg | Apr. 1, 1947 |
| 2,443,198 | Sallach | June 15, 1948 |